(12) United States Patent
Lee et al.

(10) Patent No.: US 10,012,513 B2
(45) Date of Patent: Jul. 3, 2018

(54) COMPUTING METHOD FOR RIDESHARING PATHS, COMPUTING APPARATUS AND RECORDING MEDIUM USING THE SAME

(71) Applicant: National Tsing Hua University, Hsinchu (TW)

(72) Inventors: Che-Rung Lee, Hsinchu (TW); Oscar Li Jen Hsu, Taichung (TW)

(73) Assignee: National Tsing Hua University, Hsinchu (TW)

( * ) Notice: Subject to any disclaimer, the term of this patent is extended or adjusted under 35 U.S.C. 154(b) by 58 days.

(21) Appl. No.: 15/238,556

(22) Filed: Aug. 16, 2016

(65) Prior Publication Data

US 2017/0314947 A1 Nov. 2, 2017

(30) Foreign Application Priority Data

Apr. 28, 2016 (TW) .............................. 105113208 A

(51) Int. Cl.
*G01C 21/34* (2006.01)
*G01C 21/36* (2006.01)

(52) U.S. Cl.
CPC ..... *G01C 21/3438* (2013.01); *G01C 21/3617* (2013.01); *G01C 21/3446* (2013.01)

(58) Field of Classification Search
CPC ............ G01C 21/3438; G01C 21/3446; G01C 21/3617

(Continued)

(56) References Cited

U.S. PATENT DOCUMENTS 6,477,465 B1* 11/2002 McCall .................. G01C 21/16
 701/454
7,080,019 B1 7/2006 Hurzeler
(Continued)

FOREIGN PATENT DOCUMENTS

CN 101216913 11/2010
CN 104992044 10/2015
(Continued)

OTHER PUBLICATIONS

"Office Action of Taiwan Counterpart Application," dated Dec. 27, 2016, p. 1-p. 3, in which the listed references were cited.
(Continued)

*Primary Examiner* — Atul Trivedi
(74) *Attorney, Agent, or Firm* — J.C. Patents

(57) ABSTRACT

A computing method for ridesharing paths, a computing apparatus and a recording medium using the same are provided. This invention finds the ridesharing paths out from the target trajectory which have ridesharing relationship with a plurality of candidate trajectories. People on the ridesharing paths can share a ride on a part of or whole target trajectory. In the computing method, a trajectory is transformed into a sequence of blocks. After target trajectory and a plurality of the candidate trajectories are transformed, it is determined whether each of the blocks of the candidate trajectories overlaps with at least one of the blocks of the target trajectory. Then, ridesharing paths are calculated according the screened candidate trajectories. This method is many-to-one method which compares a plurality of the candidate trajectories to one target trajectory at one time.

20 Claims, 4 Drawing Sheets

(58) Field of Classification Search
USPC .......................................................... 701/533
See application file for complete search history.

(56) References Cited

U.S. PATENT DOCUMENTS

| | | | |
|---|---|---|---|
| 9,111,380 B2* | 8/2015 | Piemonte | G06T 15/005 |
| 9,689,694 B2* | 6/2017 | Lord | G01C 21/343 |
| 9,696,719 B2* | 7/2017 | Aviel | G05D 1/0088 |
| 2001/0022558 A1* | 9/2001 | Karr, Jr. | G01S 1/026 |
| | | | 342/450 |
| 2012/0190380 A1* | 7/2012 | Dupray | G01S 1/026 |
| | | | 455/456.1 |
| 2013/0060586 A1 | 3/2013 | Chen et al. | |
| 2013/0282271 A1* | 10/2013 | Rubin | G08G 9/02 |
| | | | 701/423 |
| 2015/0019124 A1* | 1/2015 | Bandyopadhyay | G01C 17/38 |
| | | | 701/410 |
| 2015/0141043 A1* | 5/2015 | Abramson | G01C 21/34 |
| | | | 455/456.1 |
| 2015/0168174 A1* | 6/2015 | Abramson | G01C 21/3697 |
| | | | 701/408 |
| 2015/0168175 A1* | 6/2015 | Abramson | G01C 21/34 |
| | | | 701/408 |
| 2015/0254581 A1 | 9/2015 | Brahme | |
| 2015/0323335 A1* | 11/2015 | Lord | G06Q 10/063114 |
| | | | 705/7.15 |
| 2016/0210860 A1* | 7/2016 | Belzner | G08G 1/147 |
| 2017/0255966 A1* | 9/2017 | Khoury | G08G 1/0129 |

FOREIGN PATENT DOCUMENTS

| | | |
|---|---|---|
| TW | 201239805 | 10/2012 |
| TW | 201535300 | 9/2015 |

OTHER PUBLICATIONS

Hsu et al., "Approach for Finding Ridesharing Paths in Spatiotemporal Space," The Fifth International Conference on Smart Cities, Systems, Devices and Technologies, May 22, 2016, pp. 37-43.

\* cited by examiner

COMPUTING METHOD FOR RIDESHARING PATHS, COMPUTING APPARATUS AND RECORDING MEDIUM USING THE SAME

CROSS-REFERENCE TO RELATED APPLICATION

This application claims the priority benefit of Taiwan application serial no. 105113208, filed on Apr. 28, 2016. The entirety of the above-mentioned patent application is hereby incorporated by reference herein and made a part of this specification.

BACKGROUND OF THE INVENTION

Field of the Invention

The invention relates to a path computing method, and particularly relates to a computing method for ridesharing paths, a computing apparatus and a recording medium using the same.

Description of Related Art

In recent years, the government actively promotes public transport services so that people may enjoy convenient and fast riding services. The public transportation usually has a fixed route and time schedule, or even filled with passengers. Comparatively, motorcycles and cars have higher convenience. However, not all people have their own cars. It is changed from an era of excess supply of resources to an era of resource sharing, and ridesharing service is an application of resource sharing.

In recent years, many researches for analyzing the ridesharing problem by using a global position system (GPS) trajectory in space or spatiotemporal space have been undertaken. In a part of the existing methods for finding ridesharing paths, a road network has to be used to calculate ridesharing paths. The existing method without using the road network is the grid map method, by which a map is divided into a plurality of blocks, like a chessboard, and two paths has ridesharing relation if they were in the same block. However, the problem of the grid map method is that only the paths in the same block are considered as a candidate of possible ridesharing paths but the paths in the adjacent blocks were not even if the gap between two paths in adjacent blocks is just a few centimeters. In other words, the grid map method may overlook some possible candidates. Therefore, it is necessary to provide a solution to find more and better ridesharing paths without using the road network.

SUMMARY OF THE INVENTION

The invention provides a computing method for ridesharing paths, and a computing apparatus and a recording medium using the same, by which a sequence of blocks of a trajectory are determined according to the points of the trajectory, and blocks of a plurality of candidate trajectories are compared with blocks of the target trajectory, so as to find the ridesharing paths out from the target trajectory which have ridesharing relationship with a plurality of candidate trajectories, where the target trajectory and the candidate trajectories may from history files, such as GPS trajectory history in a smartphone. People on the ridesharing paths can share a ride on a part of or whole target trajectory. It should be noted that this computing method is a many-to-one method which compares a plurality of the candidate trajectories to one target trajectory at one time. By this computing method, this invention can find more ridesharing paths than the grid map method.

The invention provides a computing apparatus for ridesharing paths, which includes a storage and a processor. The storage includes a plurality of modules and stores a target trajectory and a plurality of candidate trajectories. The processor is coupled to the storage, and accesses and executes the modules storing in the storage. The modules include a trajectory blocks determination module, a trajectory blocks comparison module, and a ridesharing path calculation module. The trajectory blocks determination module determines a sequence of blocks according to a plurality of points of a trajectory, and sequentially classifies each point into one of the blocks of the trajectory. After all of the candidate trajectories and the target trajectory are processed by the trajectory blocks determination module, the trajectory blocks comparison module sequentially determines whether each block of the candidate trajectories overlaps with one or more blocks of the target trajectory, so as to screen at least one candidate trajectories. The ridesharing path calculation module calculates ridesharing paths according the screened candidate trajectories.

According to another aspect, the invention provides a computing method for ridesharing paths, which is adapted to a computing apparatus for comparing a plurality of candidate trajectories with a target trajectory. The computing method include following steps. For each of a plurality of trajectories, a sequence of blocks is determined according to a plurality of points of the trajectory, and each point of the trajectory is sequentially classified into one of the blocks. It is sequentially determined that whether each of the blocks of the candidate trajectories overlaps with one or more blocks of target trajectory, so that at least one of the candidate trajectories are screened. Then, ridesharing paths are calculated according the screened at least one candidate trajectory.

Moreover, the invention also provides a non-transitory computer-readable recording medium, which records a program, a target trajectory and a plurality of candidate trajectories, and a computing apparatus loads the same to execute following steps. For each of a plurality of trajectories, a sequence of blocks is determined according to a plurality of points of the trajectory, and each point of the trajectory is sequentially classified into one of the blocks of the trajectory. It is sequentially determined that whether each block of the candidate trajectories overlaps with one or more blocks of target trajectory, so that at least one of the candidate trajectories are screened. Then, ridesharing paths are calculated according the screened at least one candidate trajectory.

According to the above descriptions, in the computing method for ridesharing paths, the computing apparatus and the recording medium using the same, the points of the target trajectory and the candidate trajectories are respectively specified to form a plurality of blocks of the target trajectory and a plurality of blocks of the candidate trajectories, and after all of the points are classified into the blocks of the target trajectory and the blocks of a plurality of the candidate trajectories, it is determined whether each of the blocks of the candidate trajectories overlaps with each of the blocks of target trajectory, so as to screen a part of or all of the points of a plurality of candidate trajectories, and accordingly determine ridesharing paths. In this way, the position of a block is according to the points classified into the block.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
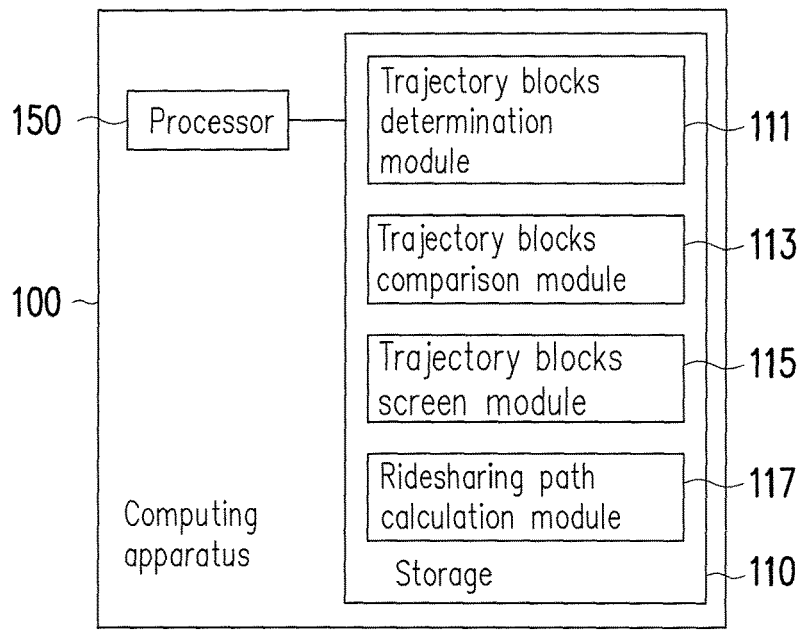
FIG. 1 is a block diagram of a computing apparatus for ridesharing paths according to an embodiment of the invention.

FIG. 1 is a block diagram of a computing apparatus for ridesharing paths according to an embodiment of the invention. Referring to FIG. 1, the computing apparatus 100 at least includes (but not limited thereto) a storage 110 and a processor 150. The computing apparatus 100 can be an electronic device such as a server, a client, a desktop computer, a notebook computer, a smart phone, a network computer, a workstation, a personal digital assistant (PDA), a personal computer (PC), etc., which is not limited by the invention.

The storage 110 can be any type of a fixed or movable random access memory (RAM), a read-only memory (ROM), a flash memory or a similar device or a combination of the above devices. In the present embodiment, the storage 110 is used for storing a target trajectory (including multiple points of the target trajectory), candidate trajectories (including multiple points of the candidate trajectories), program codes, device configurations, buffer or permanent data, and records software programs such as a trajectory blocks determination module 111, a trajectory blocks comparison module 113, a trajectory blocks screen module 115 and a ridesharing paths calculation module 117, etc. The aforementioned modules can be accessed and executed by the processor 150, and detailed operation thereof is described later in following embodiments. The storage 110 of the present embodiment is not limited to be a single memory device, and the aforementioned modules can be separately stored in two or more memory devices of the same or different types.

The functions of the processor 150 can be implemented by a programmable unit such as a central processing unit (CPU), a microprocessor, a micro controller, a digital signal processing (DSP) chip, a field programmable gate array (FPGA), etc. The functions of the processor 150 can also be implemented by an independent electronic device or a integrated circuit (IC), and the processor 150 can also be implemented by hardware or software.

Figure 2:
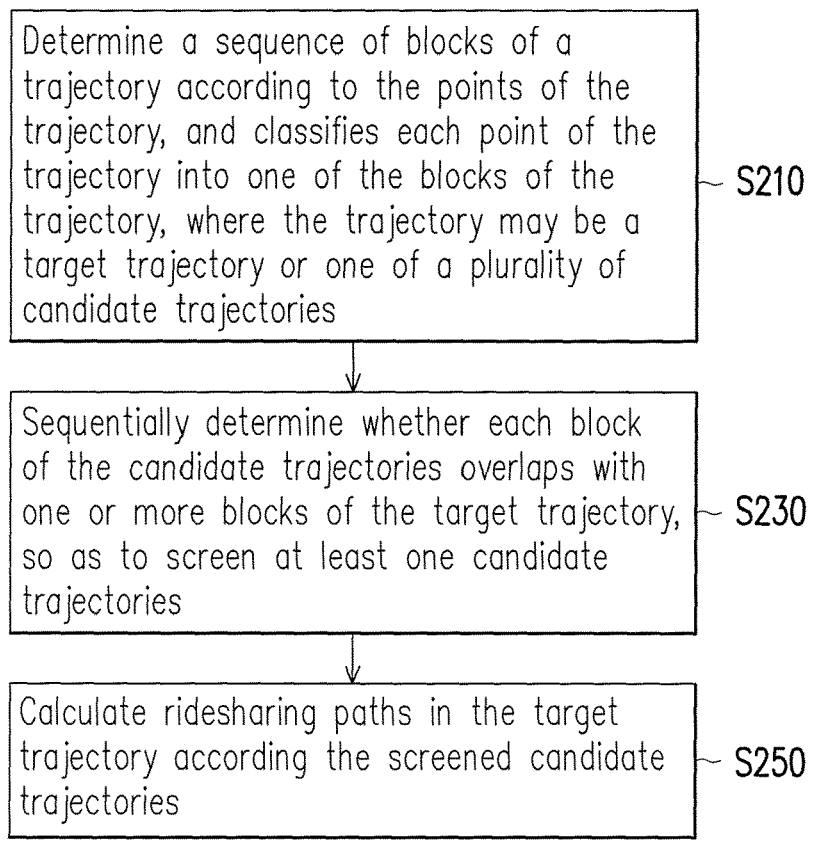
FIG. 2 is a flowchart illustrating a computing method for ridesharing paths according to an embodiment of the invention.

In order to facilitate the understanding of an operation flow of the embodiments of the invention, a plurality of embodiments is provided below to describe the flow of the computing method for ridesharing paths executed by the computing apparatus 100 of the invention. FIG. 2 is a flowchart illustrating a computing method for ridesharing paths according to an embodiment of the invention. Referring to FIG. 2, the computing method of the present embodiment is adapted to the computing apparatus 100 of FIG. 1. In the following description, the computing method of the present embodiment is described below with reference of various components and modules in the computing apparatus 100. The flow of the computing method can be adjusted according to an actual implementation, which is not limited by the invention.

In step S210, the trajectory blocks determination module 111 determines a sequence of blocks of a trajectory according to the points of the trajectory. Each point of the trajectory was sequentially classified into one of the blocks of the trajectory. The trajectory may be a target trajectory or one of a plurality of candidate trajectories in the present embodiment. In other words, all of the candidate trajectories and the target trajectory are processed by the trajectory blocks determination module 111 in the present embodiment.

The target trajectory and the candidate trajectories respectively include a plurality of points of a positioning system such as a GPS, a Galileo positioning system or a global navigation satellite system (GLONASS), etc., which can be obtained from the storage 110, the Internet or other electronic apparatus. Each point of the trajectories may correspond to geographical location-related information such as certain longitude and latitude, altitude, time, etc. Two paths have a ridesharing relationship if the gap between the two paths is smaller than a predefined spatial parameter $\varepsilon$ (e.g., 10, 20, 50 meters, etc.) and/or a predefined temporal parameter $\tau$ (e.g., 10, 30, 60 minutes). A path may be a whole trajectory or a part of trajectory. The parameters are set in the processor 150 to select a part of or all of the points of a trajectory, which is not limited by the invention.

Figure 3A:
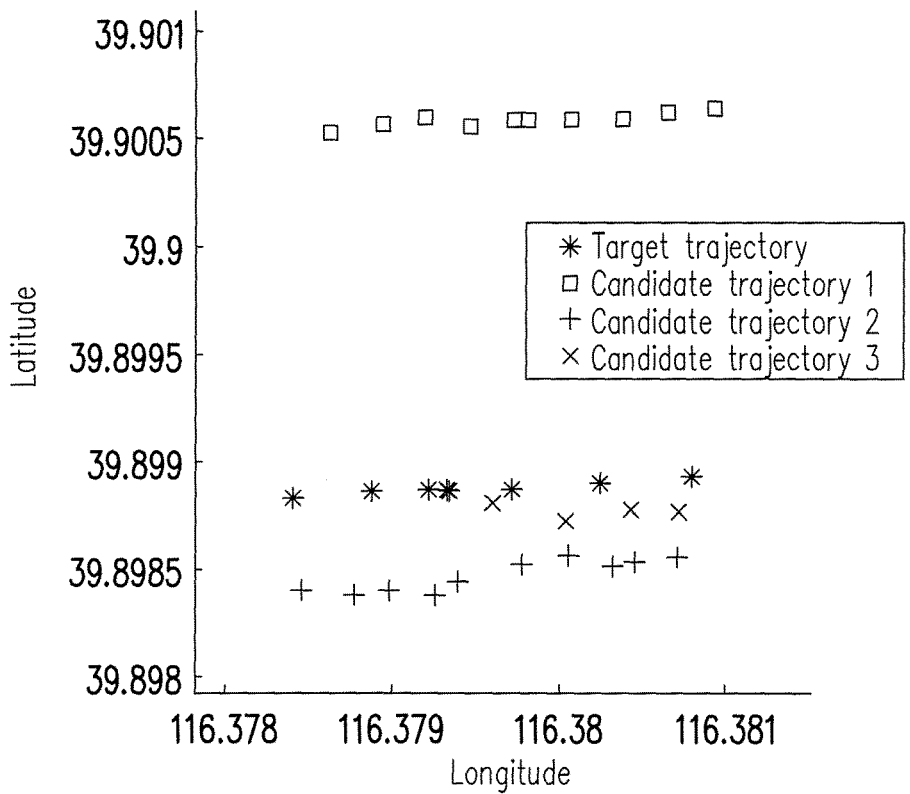
FIG. 3A and FIG. 3B are respective schematic diagrams presenting points in a spatial coordinate diagram and a spatiotemporal coordinate diagram.
Figure 3B:
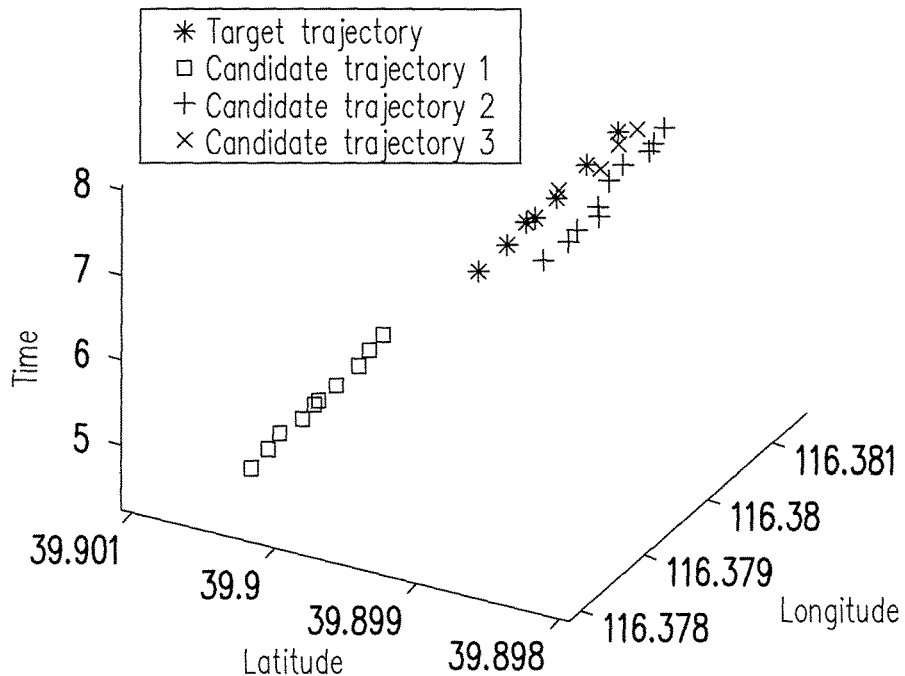

In the present embodiment, the trajectory blocks determination module 111 considers a spatiotemporal (including latitude, longitude and time) coordinate system. For example, table 1 to table 4 respectively list the target trajectory of a user A and three candidate trajectories of a user B, where the time is converted into seconds in the time column. For example, 21:03:59 p.m. is converted into 75839 seconds. FIG. 3A and FIG. 3B are respective schematic diagrams presenting the aforementioned points of the trajectories in a spatial coordinate diagram and a spatiotemporal coordinate diagram.

TABLE 1

| Code | Longitude | Latitude | Time (seconds) |
|------|-----------|----------|----------------|
| 1 | 116.380796 | 39.898930 | 75839 |
| 2 | 116.380240 | 39.898906 | 75844 |
| 3 | 116.379711 | 39.898875 | 75849 |
| 4 | 116.379338 | 39.898864 | 75854 |
| 5 | 116.379334 | 39.898879 | 75859 |
| 6 | 116.379221 | 39.898870 | 75864 |
| 7 | 116.378887 | 39.898856 | 75869 |
| 8 | 116.378413 | 39.868829 | 75874 |

TABLE 2

| Code | Longitude | Latitude | Time (seconds) |
|---|---|---|---|
| 1 | 116.378630 | 39.900524 | 44024 |
| 2 | 116.378943 | 39.900567 | 44044 |
| 3 | 116.379198 | 39.900591 | 44064 |
| 4 | 116.379472 | 39.900551 | 44084 |
| 5 | 116.379720 | 39.900581 | 44104 |
| 6 | 116.379801 | 39.900585 | 44109 |
| 7 | 116.380060 | 39.900584 | 44129 |
| 8 | 116.380376 | 39.900580 | 44149 |
| 9 | 116.380681 | 39.900612 | 44169 |
| 10 | 116.380925 | 39.900638 | 44189 |

TABLE 3

| Code | Longitude | Latitude | Time (seconds) |
|---|---|---|---|
| 1 | 116.380701 | 39.898558 | 78529 |
| 2 | 116.380455 | 39.898532 | 78544 |
| 3 | 116.380321 | 39.898511 | 78559 |
| 4 | 116.380051 | 39.898560 | 78574 |
| 5 | 116.379769 | 39.898526 | 78589 |
| 6 | 116.379399 | 39.898446 | 78604 |
| 7 | 116.379262 | 39.898379 | 78619 |
| 8 | 116.378984 | 39.898397 | 78634 |
| 9 | 116.378783 | 39.898378 | 78649 |
| 10 | 116.378455 | 39.898405 | 78669 |

TABLE 4

| Code | Longitude | Latitude | Time (seconds) |
|---|---|---|---|
| 1 | 116.380715 | 39.898774 | 77481 |
| 2 | 116.380432 | 39.898776 | 77506 |
| 3 | 116.380035 | 39.898724 | 77531 |
| 4 | 116.379597 | 39.898806 | 77556 |

According to different design requirements, in other embodiment, the trajectory blocks determination module 111 may also consider a coordinate system of three-dimensional space (spatiotemporal space including longitude, latitude and time), or a coordinate system of two-dimensional space (spatial space including longitude and latitude), which is not limited by the invention.

After the trajectory blocks determination module 111 obtains the points of the target trajectory and the candidate trajectories, the trajectory blocks determination module 111 determines the corresponding blocks. Each block represents a segment of a trajectory which the segment is a plurality of points of the trajectory. The segment will not exceed a block. Otherwise, the module will use a new block to contain the exceeding part. Therefore, the module 111 determines a sequence of blocks of the trajectory. The block size of all the blocks of the trajectories is defined in the trajectory blocks determination module 111. For example, in the spatiotemporal coordinate system, the block size is a spatiotemporal size including a spatial parameter ε (e.g., 50, 100, 300 meters, etc.) for both widths of the block and a temporal parameter τ (e.g., 100, 360, 720 seconds, etc.) for height of the block, such that each block of the target trajectory and each block of the candidate trajectories are formed as three-dimensional objects (e.g., cube, sphere or cylinder, etc.) in the spatiotemporal coordinate system. The spatial parameter ε and the temporal parameter τ also represent the maximal spatial distance and time difference between two ridesharing paths, where the spatial distance and the time difference between two paths from different trajectories are smaller than e and r, will be consider as ridesharing paths.

It should be noted that according to different coordinate systems, the corresponding parameters are probably different (for example, a longitude value and a latitude value for width, a altitude value for height, etc.), though the invention is not limited thereto. In order to facilitate subsequent operation and description, the block object is taken as an example for description below, though the invention is not limited thereto.

Then, the trajectory blocks determination module 111 initializes one block (e.g., the $j^{th}$ block) of a trajectory, and sequentially (for example, according to a time sequence or a data input sequence) classifies the $i^{th}$ point of the trajectory into the $j^{th}$ block of the trajectory. A initial block is a abstract container where the only setting of the block is block size. The center and the direction of the block will be set after a plurality of points of trajectory is classified into the block. On each classification of a point, the module 111 determines whether a longitude range or a latitude range of the points in the $j^{th}$ block is larger than the spatial parameter ε, or a time range of the points in the $j^{th}$ block is larger than the temporal parameter τ, so as to determine whether to reclassify the $i^{th}$ point into the $(j+1)^{th}$ block, a new block, and the $j^{th}$ block will be completed after the reclassifying where no more point will be classified into the $j^{th}$ block. In which, i is a positive integer incremented from 1 to a total number of the points of the trajectory, and j is a positive integer incremented from 1 to a total number of the blocks of the trajectory. The range of the points are determined by equations (1)-(7). A longitude range, a latitude range and a time range are zero when there is only one point in a block (e.g., when i and j both are one).

In an embodiment, the ranges include a longitude range, a latitude range and a time range. The trajectory blocks determination module 111 takes a latitude coordinate of the $k^{th}$ point of a trajectory, which is the first point classified into the $j^{th}$ block of the trajectory, as the latitude reference point, and extracts the minimum and the maximum longitude from the points in the $j^{th}$ block, so as to determine the longitude distance between the minimum and the maximum longitude based on the latitude reference point. The longitude range is the longitude distance in meters. The longitude range can be sequentially obtained through following equations (1)-(3):

$$b1=\min\_Longitude(c_j), b2=\max\_Longitude(c_j) \quad (1)$$

$$lat1=Latitude(first\_point(c_j)) \quad (2)$$

$$lng\_range(c_j)=dist((lat1,b1),(lat1,b2)) \quad (3)$$

Where $c_j$ represents the $j^{th}$ block, min_Longitude( ) represents to extract the minimum longitude from the points in a block, max_Longitude( ) represent to extract the maximum longitude from the points in a block, Latitude( ) represents to obtain the latitude coordinate of a point, first_point( ) represents to obtain the point first classified into a block, dist( ) represents to calculate a distance between two points, and lng_range( ) represents a longitude range of the points in a block.

The trajectory blocks determination module 111 also takes the longitude coordinate of the $k^{th}$ point as the longitude reference, and selects a minimum latitude and a maximum latitude from the points in the $j^{th}$ block, so as to determine a latitude range of the points in the $j^{th}$ block. The latitude range can be sequentially obtained through following equations (4)-(6):

$$d1=\min\_Latitude(c_j), d2=\max\_Latitude(c_j) \quad (4)$$

$$lng1=Longitude(first\_point(c_j)) \quad (5)$$

$$lat\_range(c_j)=dist((d1,lng1),(d2,lng1)) \quad (6)$$

Where, min_Latitude( ) represents to extract the minimum latitude from the points in a block, max_Latitude( ) represents to extract the maximum latitude from the points in a block, Longitude( ) represents to obtain the longitude coordinate of a point, and lat_range( ) represents a latitude range of the points in a block.

It should be noted that in the other embodiments, the trajectory blocks determination module 111 may also directly calculate a difference between the maximum latitude and the minimum latitude and a difference between the maximum longitude and the minimum longitude of all of the points in the $j^{th}$ block, so as to respectively determine the latitude range and the longitude range.

Moreover, the trajectory blocks determination module 111 extracts the maximum time and the minimum time from the points in the $j^{th}$ block. The time range can be obtained according to a following equation (7):

$$\text{time\_range}(c_j) = \text{max\_Timestamp}(c_j) - \text{min\_Timestamp}(c_j) \quad (7)$$

Where, min_Timestamp( ) represents to extract the minimum time from the points in a block, max_Timestamp( ) represents to extract the maximum time from the points in a block, and time_range( ) represents the time range of the points in a block.

After the $i^{th}$ point had been classified into the $j^{th}$ block and the range of the points in the $j^{th}$ block was obtained, the trajectory blocks determination module 111 determines whether the current ranges of the points in the $j^{th}$ block is smaller than the block size, for example, whether the longitude range and the latitude range are smaller than the spatial parameter ε, and whether the time range is smaller than the time parameter τ. If the longitude range and the latitude range are greater than the spatial parameter ε or the time range is greater than the time parameter τ, the trajectory blocks determination module 111 removes the $i^{th}$ point of the trajectory from the $j^{th}$ block, and initializes a $(j+1)^{th}$ block, and reclassifies the $i^{th}$ point into the $(j+1)^{th}$ block. Then, the trajectory blocks determination module 111 subsequently processes an $(i+1)^{th}$ point of the trajectory, and determines the range of the points in the $(j+1)^{th}$ block. Moreover, after the $i^{th}$ point was reclassified to the $(j+1)^{th}$ block, the center and the direction of the $j^{th}$ block can be determined according to all of the points (for example, from the $k^{th}$ point to an $(i-1)^{th}$ point) kept in the $j^{th}$ block.

Conversely, if the longitude range and the latitude range are smaller than the spatial parameter ε and the time range is smaller than the temporal parameter τ, the trajectory blocks determination module 111 continually keeps the $i^{th}$ point in the $j^{th}$ block, and subsequently processes the $(i+1)^{th}$ point, and continually determines the range of the points in the $j^{th}$ block.

Deduced by analogy, the trajectory blocks determination module 111 determines a sequence of blocks of a target trajectory and all of the candidate trajectories, classifies all of the points of the target trajectory into the blocks of the target trajectory, and classifies all of the points of the candidate trajectories into the blocks of the candidate trajectories. For the candidate trajectories, each candidate trajectory will be determined respectively by the module.

Figure 4A:
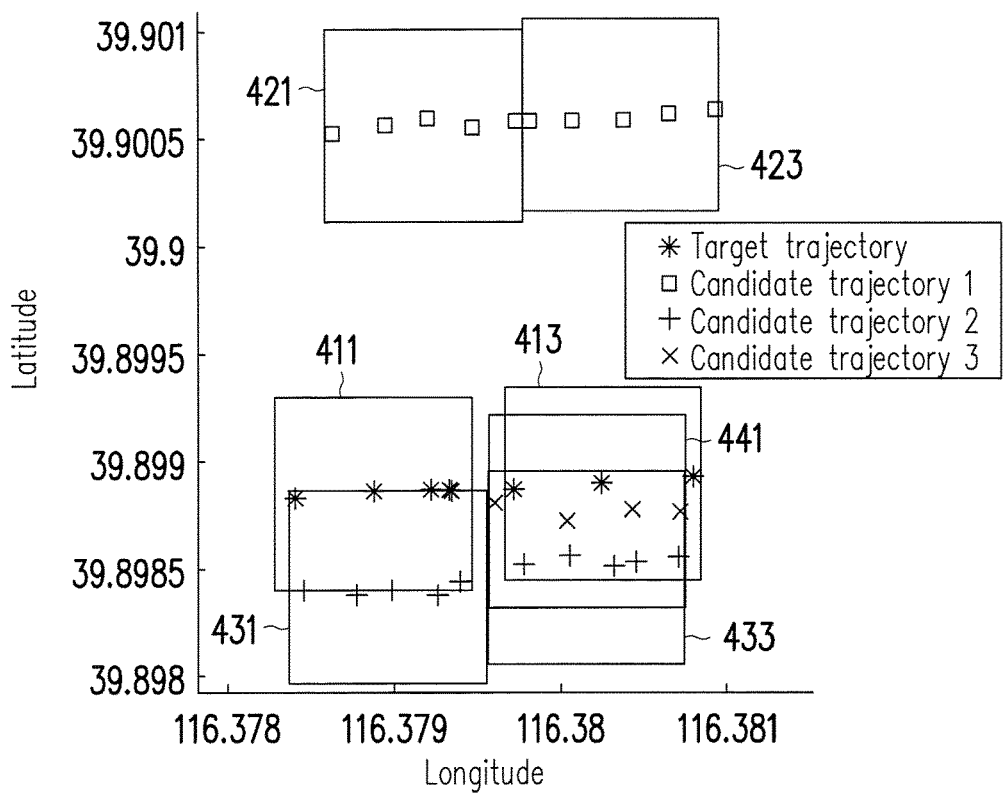
FIG. 4A and FIG. 4B are respective schematic diagrams presenting points and blocks in a spatial coordinate diagram and a spatiotemporal coordinate diagram.
Figure 4B:
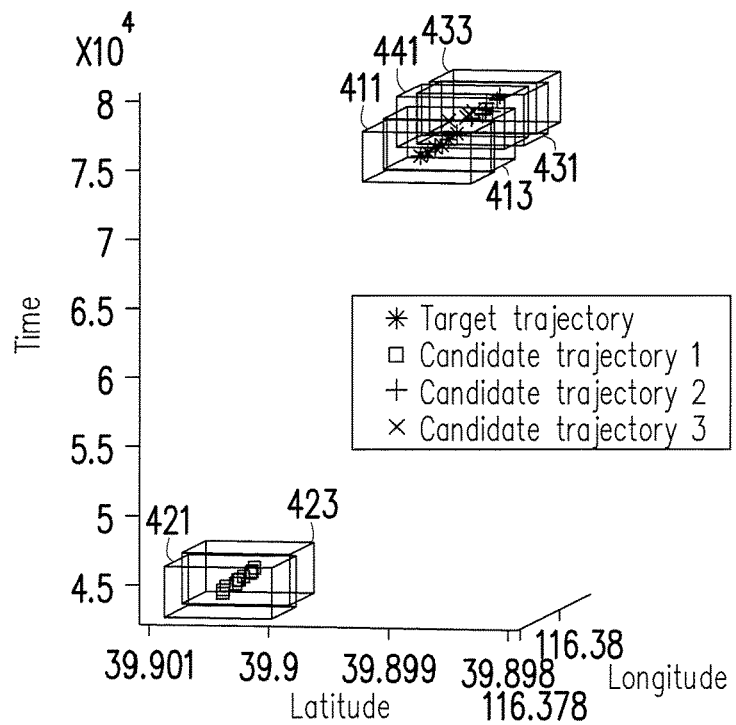

For example, FIG. 4A and FIG. 4B are respective schematic diagrams presenting the points of the trajectories and the blocks (including the blocks of the target trajectory and the blocks of the candidate trajectories) in a spatial coordinate diagram and a spatiotemporal coordinate diagram. Referring to FIG. 4A and FIG. 4B, it is assumed that the spatial parameter ε is 100 meters, and the temporal parameter τ is 3600 seconds. After the point of the code 2 in the target trajectory (i.e. the table 1) of the user A is added to the block 411 of the target trajectory, the longitude range (about 47 meters) and the latitude range (about 3 meters) of all the points in the first block 411 of the target trajectory are smaller than the spatial parameter ε and the temporal range (5 seconds) is smaller than the temporal parameter τ, it is continually determined whether the point of the code 3 is classified into the block 411 of the target trajectory. Since after the point of the code 4 in the target trajectory is added to the block 411 of the target trajectory, the longitude range (about 120 meters) of the points in the first block 411 of the target trajectory is larger than the spatial parameter ε, the point of the code 4 is removed from the block 411 of the target trajectory. The point of the code 4 is added to the block 413 of the target trajectory, and it is determined that the block 411 of the target trajectory only includes the points of the codes 1 to 3, so as to determine the block 411 of the target trajectory (the block shown in FIG. 4B) and the central position of the block.

Deduced by analogy, the points of the target trajectory of the user A can be respectively classified into the block 411 and 413 of the target trajectory, and the points (i.e. the table 2) of the candidate trajectory 1 of the user B can be classified into block 421 and 423 of the candidate trajectory 1, the points (i.e. the table 3) of the candidate trajectory 2 of the user B can be classified into the block 431 and 433 of the candidate trajectory 2, and the points (i.e. the table 4) of candidate trajectory 3 of the user B can be classified into the block 441 of the candidate trajectory 3.

The trajectory blocks determination module 111 also calculates the center of the $j^{th}$ block (following equations (8)-(11)) for the use of subsequent trajectory blocks comparison module 113.

$$x_{c_j} = \frac{\text{max\_Longitude}(c_j) + \text{min\_Longitude}(c_j)}{2} \quad (8)$$

$$y_{c_j} = \frac{\text{max\_Latitude}(c_j) + \text{min\_Latitude}(c_j)}{2} \quad (9)$$

$$z_{c_j} = \frac{\text{max\_Timestamp}(c_j) + \text{min\_Timestamp}(c_j)}{2} \quad (10)$$

$$\text{center}(c_j) = (x_{c_j}, y_{c_j}, z_{c_j}) \quad (11)$$

Where center( ) represents to obtain center coordinate $((x_{c_j}, y_{c_j}, z_{c_j})$ represents (longitude-coordinate, latitude-coordinate, time-coordinate)). In other words, the trajectory blocks determination module 111 selects the minimum longitude, the minimum latitude, the minimum time, the maximum longitude, the maximum latitude and the maximum time from the points in the $j^{th}$ block, and adds the corresponding values to calculate an average to obtain the center coordinate $(x_{c_j}, y_{c_j}, z_{c_j})$.

The trajectory blocks determination module 111 also determines a direction of the $j^{th}$ block according to a connection line between the $k^{th}$ point and the $p^{th}$ point in the $j^{th}$ block, where p is a positive integer between k+1 and the total number of the points of the trajectory, and the $p^{th}$ point is the last point classified into the $j^{th}$ block. The trajectory blocks determination module 111 adopts a following equation (12) to determine the direction of the $j^{th}$ block:

$$\text{direction}(c_j) = \arctan(\text{Latitude}(\text{last\_point}(c_j)) - \text{Latitude}(\text{first\_point}(c_j)), \text{Longitude}(\text{last\_point}(c_j)) - \text{Longitude}(\text{first\_point}(c_j))) \quad (12)$$

Where, last_point( ) represents to obtain the last point in a block, arctan(,) represents to obtain reverse tangent value, which is an angle, from the latitude (Y axis) difference and the longitude (X axis) difference, direction( ) represents to obtain the moving direction of the points in a block. In other words, the trajectory blocks determination module 111 calculates an angle by using an arctangent function according to the connection line between the first and the last points in the $j^{th}$ block (for example, the $k^{th}$ point and the $p^{th}$ point), and takes the angle as the direction of the $j^{th}$ block (inner path).

Moreover, the dist( ) used in the aforementioned equations (3) and (6) can be deduced according to a following equation (13) to obtain the distance corresponding to the surface of the earth:

$$dist((Lat1, Lng1), (Lat2, Lng2)) = \qquad (13)$$
$$1000 \times 6371 \times 2 \times \arcsin\left(\frac{\sqrt{\Delta((Lat1, Lng1), (Lat2, Lng2))}}{2}\right)$$

Where, (Lat1,Lng1) and (Lat2, Lng2) respectively represent longitude and latitude coordinates of two positions, and $\Delta((Lat1,Lng1),(Lat2,Lng2))=(\cos(Lat2)\cos(Lng2)-\cos(Lat1)\cos(Lng1))^2+(\cos(Lat2)\sin(Lng2)-\cos(Lat1)\sin(Lng1))^2+(\sin(Lat2)-\sin(Lat1))^2$ After all of the blocks of the target trajectory and all of the blocks of the candidate trajectories are determined, in step S230, the trajectory blocks comparison module 113 sequentially determines whether each of the blocks of the target trajectory overlaps with the blocks of candidate trajectories.

To be specific, the trajectory blocks comparison module 113 sequentially determines whether a distance between the center of each of the blocks of the target trajectory and the center of each of the blocks of the candidate trajectories is smaller than the spatial parameter ε and the temporal parameter τ, and simultaneously determines whether an included angle between the direction of each of the blocks of the target trajectory and each of the blocks of the candidate trajectories is smaller than the included angle parameter δ, so as to sequentially determine that each of the blocks of the candidate trajectories overlaps with any block of the target trajectory.

The spatial parameter ε, the temporal parameter τ and the included angle parameter δ are determined by the user who uses this technology. The trajectory blocks comparison module 113 sequentially determines whether the difference between the center of each block of the candidate trajectories and the center of each block of the target trajectory is smaller than the spatial parameter ε and the temporal parameter τ according to a following equation (14).

$$isIntersect(c_j, c_m) \begin{cases} \text{If } dist((y_{c_j}, x_{c_j}), (y_{c_j}, x_{c_m})) < \varepsilon \\ \text{is true, and } dist((y_{c_j}, x_{c_j}), (y_{c_m}, x_{c_j})) < \varepsilon \\ \text{and } |z_{c_j} - z_{c_m}| < \tau \\ \text{is false, otherwise} \end{cases} \quad (14)$$

Where, $(x_{c_j}, y_{c_j}, z_{c_j})$ represents the center coordinates of the $j^{th}$ block of the target trajectory, $(x_{c_m}, y_{c_m}, z_{c_m})$ represents the center coordinates of the $m^{th}$ block of all the candidate trajectories (m is between 1 and the total number of the blocks in all the candidate trajectories), isIntersect( ) is a Boolean function indicating whether two blocks are overlapped (true represents two blocks are overlapped, and false represents two blocks are not overlapped). In other words, whether there is an overlap between two blocks on the spatiotemporal coordinate system is calculated according to the difference of the centers of these two blocks.

In operation of the equation (14), the trajectory blocks comparison module 113 may first calculates whether there is an overlap along the longitude axis. For example, a latitude value $y_{c_j}$ of the center of the $j^{th}$ block is taken as a reference to calculate a distance between a longitude value $x_{c_j}$ of the center of the $j^{th}$ block and a longitude value $x_{c_m}$ of the center of the $m^{th}$ block, and determine whether the distance is smaller than the spatial parameter ε (i.e., $dist((y_{c_j}, x_{c_j}),(y_{c_j}, x_{c_m}))<\varepsilon$). The trajectory blocks comparison module 113 may also calculate whether there is an overlap along the latitude axis. For example, a longitude value $x_{c_j}$ of the center of the $j^{th}$ block is taken as a reference to calculate a distance between a latitude value $y_{c_j}$ of the center of the $j^{th}$ block and a latitude value $y_{c_m}$ of the center of the $m^{th}$ block, and determine whether the distance is smaller than the spatial parameter ε (i.e., $dist((y_{c_j}, x_{c_j}),(y_{c_m}, x_{c_j}))<\varepsilon$). Moreover, the trajectory blocks comparison module 113 calculates whether a time difference between the centers of the $m^{th}$ block and the $j^{th}$ block is smaller than the temporal parameter τ (i.e., $|z_{c_j}-z_{c_m}|<\tau$). Finally, when the aforementioned comparison are all in compliance (i.e., all smaller than the parameters), the trajectory blocks comparison module 113 determines that the block from the candidate trajectories and the block from the target trajectory are complied with the spatial parameter ε and the temporal parameter τ (i.e., overlap on the spatiotemporal coordinate system). Conversely, the trajectory blocks comparison module 113 determines that the two blocks are not complied with the spatial parameter ε and the temporal parameter τ (i.e., no overlap on the spatiotemporal coordinate system).

It should be noted that in the present embodiment, the block can be a three dimensional block (i.e., a cube) or a two dimensional block (i.e., a plane rectangle). The trajectory blocks comparison module 113 can also determine whether three dimensional blocks or two dimensional blocks are overlapped, or determine whether the block of the target trajectory and the block of candidate trajectories are overlapped through other algorithms.

On the other hand, in the embodiment of the invention, the difference between two directions of two blocks is also considered. To be specific, the trajectory blocks comparison module 113 determines the difference of two directions of the $m^{th}$ block and the $j^{th}$ block based on the equation (12), and if an included angle between the two directions of the $m^{th}$ block and the $j^{th}$ block is determined to be smaller than the included angle parameter δ, the $m^{th}$ block and the $j^{th}$ block are determined to have the same direction. Otherwise, the directions are determined to be different. If the $m^{th}$ block and the $j^{th}$ block have different directions, the $m^{th}$ block of the candidate trajectories is excluded from the ridesharing paths list. In this way, a path formed by the points of a block of a trajectory with the direction opposite to a path in a block of another trajectory do not serve as ridesharing path. In other words, only when the distance between the centers of two blocks is smaller than the parameters (for example, the spatial parameter ε and the temporal parameter τ), and the included angle between the directions of the two blocks is smaller than the included angle parameter δ, the trajectory blocks comparison module 113 determines that the block of the candidate trajectory overlaps with the corresponding block of the target trajectory. As long as any condition is not satisfied (for example, the difference between the two centers is greater than the spatial parameter ε or the temporal parameter τ, or the included angle between the directions is greater than the included angle parameter δ), the trajectory blocks comparison module 113 determines that the block of the candidate trajectory does not overlap with the corresponding block of the target trajectory and have no ridesharing relation in these paths.

The trajectory blocks comparison module 113 records the blocks of the candidate trajectories complied with the spatial parameter ε, the temporal parameter τ and the included angle parameter δ (i.e. the blocks of the candidate trajectories determined to be overlapped) to the matrix L according to each of the corresponding block in the target trajectory. In the present embodiment, the matrix L is a sparse matrix in which the initial value is zero. The trajectory blocks comparison module 113 records referential numbers (or codes) (for example, an order in the blocks of the candidate trajectories) of the blocks of the candidate trajectories determined to be overlapped to an element in the matrix L corresponding to the overlapped block of the target trajectory (it is assumed that different candidate trajectories are recorded in different columns or rows). It is assumed that different candidate trajectories are recorded in different columns, different blocks of a target trajectory are recorded in different rows. The matrix L can be transposed and be viewed by another angle, which is not limited by the invention.

Taking the data of the tables (1)-(4) as an example, it is assumed that the included angle parameter δ is 45 degree, the blocks of the target trajectory is $C1=\{c_{j1}, c_{j2}\}$ (corresponding to the blocks 411 and 413 of the target trajectory in FIG. 4B), and the blocks of the candidate trajectories is $C2=(c_{m1},c_{m2},c_{m3},c_{m4},c_{m5})$ (corresponding to the blocks 421-441 of the candidate trajectories in FIG. 4B), the matrix L is a 2×3 sparse matrix. If the overlapping is determined, the corresponding codes are recorded in the matrix L. Finally, the trajectory blocks comparison module 113 may calculate the matrix $$L = \begin{bmatrix} 0 & 3 & 5 \\ 0 & 4 & 0 \end{bmatrix}.$$

It should be noted that the sparse matrix is adopted to facilitate a subsequent screen operation. In other embodiments, the trajectory blocks comparison module 113 may adopt specific codes, symbols and referential numbers to record the blocks of the candidate trajectories determined to be overlapped or not overlapped, which is not limited by the invention.

Then, the trajectory blocks screen module 115 screens the candidate trajectories according to the matrix L. In the present embodiment, the trajectory blocks screen module 115 calculates a total compliance number of the blocks in the matrix L corresponding to each of the candidate trajectories and complied with the spatial parameter ε, the temporal parameter τ and the included angle parameter δ. And the trajectory blocks screen module 115 then screens the candidate trajectories according to the total compliance number corresponding to each of the candidate trajectories.

To be specific, since the referential numbers (or codes) of the blocks of the candidate trajectories determined to be overlapped have been recorded in the matrix L, and the elements corresponding to the other blocks of the candidate trajectories determined to be not overlapped are set to zero in the matrix L, the total number of the elements with a non-zero value in the column corresponding to each of the candidate trajectories in the matrix L is the total compliance number. The trajectory blocks screen module 115 may select one or a plurality of the candidate trajectories with the total compliance number greater than 0 to serve as the candidate trajectories having the ridesharing relationship with the target trajectory.

In an embodiment, it is assumed that there are n candidate trajectories, the trajectory blocks screen module 115 then defines the matrix $L=[col_1, col_2, \ldots, col_n]$, where $col_1$ to $col_n$ respectively correspond to vectors indicating whether the corresponding blocks of the candidate trajectories recoded by the first candidate trajectory to the $n^{th}$ candidate trajectory overlap with the blocks of the target trajectory. The trajectory blocks screen module 115 may delete the columns with only zero elements in the matrix L. For example, the vectors $col_2$ to $col_5$ are deleted. The remained candidate trajectories in the matrix L are the candidate trajectories (corresponding to one or a plurality of blocks of the target trajectory) having the ridesharing relationship with the target trajectory.

Taking the aforementioned matrix $$L = \begin{bmatrix} 0 & 3 & 5 \\ 0 & 4 & 0 \end{bmatrix}$$

as an example, since the elements in a first column are all zero, the trajectory blocks screen module 115 may delete the first column. Then, the trajectory blocks screen module 115 calculates the screened matrix $$L = \begin{bmatrix} 3 & 5 \\ 4 & 0 \end{bmatrix}.$$

Then, in step S250, the ridesharing path calculation module 117 calculates ridesharing paths in the target trajectory according the screened candidate trajectories. In the present embodiment, the ridesharing path calculation module 117 restores the points in the blocks of the screened candidate trajectories complied with the spatial parameter ε, the temporal parameter τ and the included angle parameter δ, and show ridesharing paths according to the restored points.

To be specific, the ridesharing path calculation module 117 may restore the points in the overlapped blocks of the candidate trajectories corresponding to a part of or all of the blocks of the target trajectory by using the screened matrix L. Taking the aforementioned screened matrix $$L = \begin{bmatrix} 3 & 5 \\ 4 & 0 \end{bmatrix}$$

as an example, a following table 5 is a restored mapping table, and values in the table 5 represent the codes corresponding to the points in the tables 1 to 4.

TABLE 5

| Target trajectory | Candidate trajectory 2 | Candidate trajectory 3 |
|---|---|---|
| 1~3 | 1~5 | 1~4 |
| 4~8 | 6~10 | |

Figure 5A:
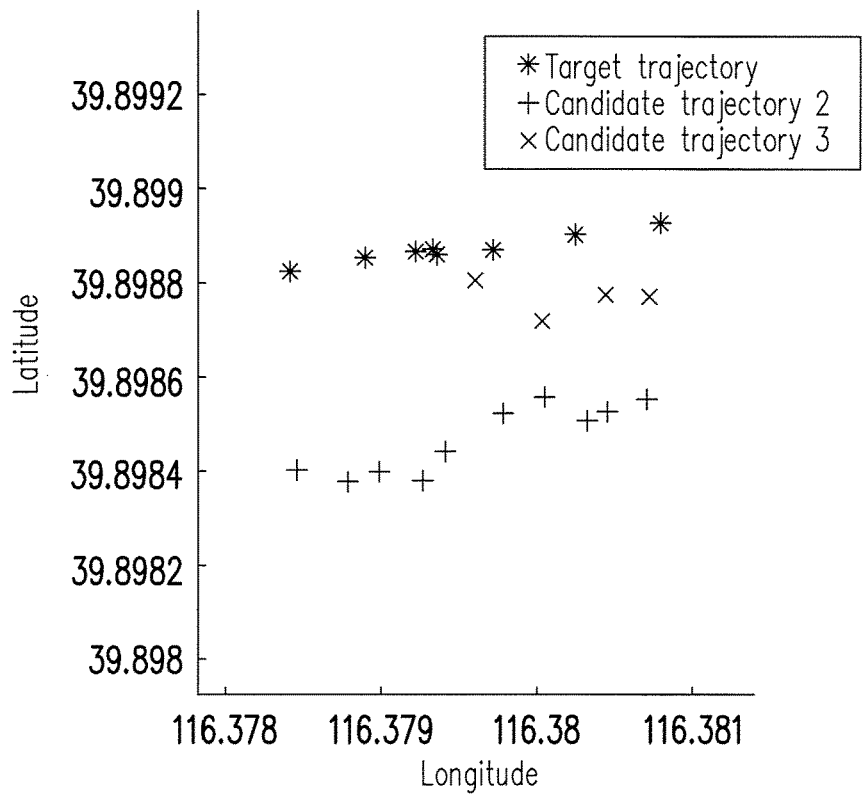
FIG. 5A and FIG. 5B are respective schematic diagrams presenting restored points in a spatial coordinate diagram and a spatiotemporal coordinate diagram.
Figure 5B:
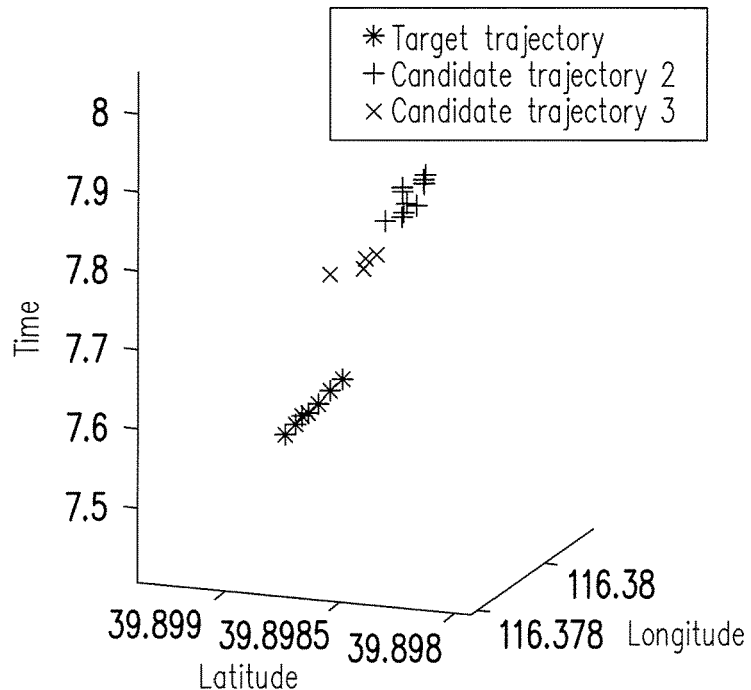

FIG. 5A and FIG. 5B are respective schematic diagrams presenting the restored points in a spatial coordinate diagram and a spatiotemporal coordinate diagram. Referring to FIG. 5A and FIG. 5B, the ridesharing path calculation module 117 obtains ridesharing paths. As a result, the target trajectory of the user A and the candidate trajectories 2 and 3 of the user B are adjacent to each other. The ridesharing path calculation module 117 may further select a part of or all of trajectory in the target trajectory and the candidate trajectories adjacent to each other to serve as the ridesharing paths, or even determine the ridesharing paths with reference to street data of a map. The determined ridesharing paths can be presented by a display unit (for example, a liquid-crystal display (LCD), a light-emitting diode (LED) display, etc.) on the computing apparatus 100, or options are provided to select the trajectory sections of the target trajectory and the candidate trajectories.

The invention provides a non-transitory computer-readable recording medium (for example, a read-only memory, a flash memory, a CD-ROM, a magnetic tape, a floppy disk, an optical data storage device, etc.), which records a computer program, and the computer program is used for executing various steps of the aforementioned computing method, and the computer program is composed of a plurality of program instructions, and after the program instructions are loaded into the computing apparatus 100, the steps of the aforementioned computing method are implemented.

In summary, in the computing method for ridesharing paths, the computing apparatus and the recording medium using the same, the blocks used for classifying the points of a trajectory are determined according to the obtained points, and each of the blocks of the candidate trajectories are sequentially compared with all of the blocks of the target trajectory, so as to screen all of or a part of the blocks of the candidate trajectories to serve as candidates for ridesharing paths. In this way, more and better ridesharing paths can be found according to the embodiments of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A computing apparatus for finding ridesharing paths in a target trajectory, comprising: a storage, recording a plurality of first points of the target trajectory and a plurality of second points of a plurality of candidate trajectories; and a processor, coupled to the storage, and configured to:
   determine a sequence of first blocks for the target trajectory according to a plurality of first points of the target trajectory, and sequentially classify each of the first points into only one of the first blocks, wherein each first block has a same predetermined size;
   determine a sequence of second blocks for each candidate trajectory according to a plurality of second points of each candidate trajectory, and sequentially classify each of the second points into only one of the second blocks, wherein each second block has the same predetermined size;
   select at least one of the second blocks which overlaps with at least one of the first blocks, and obtain the second points classified in the selected at least one second blocks;
   calculate the ridesharing paths in the target trajectory according to the obtained second points classified in the selected at least one second block; and
   display the calculated ridesharing paths on a display of the computing apparatus.

2. The computing apparatus as claimed in claim 1, wherein the processor classifies the ith first point of the target trajectory into the jth first block of the target trajectory, and determines whether a longitude range or a latitude range of the first points in the jth first block is larger than a spatial parameter, or a time range of the first points is larger than a temporal parameter, wherein if the longitude range or the latitude range of the first points in the jth first block is larger than the spatial parameter, or the time range of the first points is larger than the temporal parameter, the processor reclassifies the ith first point into the (j+1)th first block of the target trajectory, wherein i is a positive integer incremented from 1 to a total number of the first points of the target trajectory, and j is a positive integer incremented from 1 to a total number of the first blocks of the target trajectory,
   wherein the processor classifies the pth second point of each candidate trajectory into the qth second block of each candidate trajectory, and determines whether a longitude range or a latitude range of the second points in the qth second block is larger than the spatial parameter, or a time range of the second points is larger than the temporal parameter, wherein if the longitude range or the latitude range of the second points in the qth second block is larger than the spatial parameter, or the time range of the second points is larger than the temporal parameter, the processor reclassifies the pth second point into the (q+1)th second block of the candidate trajectory, wherein p is a positive integer incremented from 1 to a total number of the second points of each candidate trajectory, and q is a positive integer incremented from 1 to a total number of the second blocks of each candidate trajectory.

3. The computing apparatus as claimed in claim 2, wherein the processor takes the kth first point in the jth first block as a spatial reference point, and calculates the longitude range and the latitude range of the first points in the jth first block according to the spatial reference point, wherein the kth first point is a point first classified into the jth first block, and k is a positive integer between 1 and the total number of the first points of the target trajectory,
   wherein the processor takes the rth second point in the qth second block as a spatial reference point, and calculates the longitude range and the latitude range of the second points in the qth second block according to the spatial reference point, wherein the rth second point is a point first classified into the qth second block, and r is a positive integer between 1 and the total number of the second points of each candidate trajectory.

4. The computing apparatus as claimed in claim 3, wherein the processor determines a direction of the jth first block according to a connection line between the kth first point and the mth first point in the jth first block, wherein m is a positive integer between k+1 and the total number of the first points of the target trajectory,
   wherein the processor determines a direction of the qth second block according to a connection line between the rth second point and the sth second point in the qth second block, wherein s is a positive integer between r+1 and the total number of the second points of each candidate trajectory.

5. The computing apparatus as claimed in claim 2, wherein the processor finds out a maximum time and a minimum time of the first points in the jth first block to calculate the time range of the jth first block,
wherein the processor finds out a maximum time and a minimum time of the second points in the qth second block to calculate the time range of the qth second block.

6. The computing apparatus as claimed in claim 1, wherein the processor sequentially compares a difference between a center of each of the second blocks of the candidate trajectories and a center of each of the first blocks of the target trajectory with a spatial parameter and a temporal parameter, wherein the processor also compares an included angle between a direction of each of the second blocks of the candidate trajectories and a direction of each of the first blocks of the target trajectory with an included angle parameter, so as to determine whether each of the second blocks of the candidate trajectories overlaps with at least one of the first blocks of the target trajectory.

7. The computing apparatus as claimed in claim 6, wherein the processor records the second blocks of the candidate trajectories determined to be overlapped with the at least one first block of the target trajectory in a matrix according to each of the at least one first block of the target trajectory, and the processor is further configured to:
screen the at least one of the candidate trajectories according to the matrix.

8. The computing apparatus as claimed in claim 7, wherein the processor calculates a total compliance number of the second blocks of the candidate trajectories determined to be overlapped with the at least one first block of the target trajectory and recorded in the matrix, and screens the at least one of the candidate trajectories according to the total compliance number.

9. The computing apparatus as claimed in claim 1, wherein the processor restores the second points classified in the selected second blocks which overlaps with at least one of the first blocks, and calculates the ridesharing paths according to the restored second points.

10. The computing apparatus as claimed in claim 1, wherein the processor forms a three-dimensional object in a spatiotemporal coordinate system according to each of the first blocks of the target trajectory and each of the second blocks of the candidate trajectories, wherein all of the first blocks and the second blocks are in the same size defined by the spatial parameter and the temporal parameter.

11. A computing method for finding ridesharing paths in a target trajectory, adapted to a computing apparatus for comparing a plurality of candidate trajectories with the target trajectory, the computing method comprising:
determining a sequence of first blocks for the target trajectory according to a plurality of first points of the target trajectory, and sequentially classifying each of the first points into only one of the first blocks, wherein each first block has a same predetermined size;
determining a sequence of second blocks for each candidate trajectory according to a plurality of second points of each candidate trajectory, and sequentially classifying each of the second points into only one of the second blocks, wherein each second block has the same predetermined size;
selecting at least one of the second blocks which overlaps with at least one of the first blocks, and obtaining the second points classified in the selected at least one second blocks;
calculating the ridesharing paths in the target trajectory according to the obtained second points classified in the selected at least one second block; and
displaying the calculated ridesharing paths on a display of the computing apparatus.

12. The computing method as claimed in claim 11, wherein the step of sequentially classifying each of the first points into only one of the first blocks comprises:
classifying the ith first point of the target trajectory into the jth first block of the target trajectory; and
determining whether a longitude range or a latitude range of the first points in the jth first block is larger than a spatial parameter, or a time range of the first points is larger than a temporal parameter, so as to determine whether to reclassify the ith first point into the (j+1)th first block, wherein i is a positive integer incremented from 1 to a total number of the first points of the target trajectory, and j is a positive integer incremented from 1 to a total number of the first blocks of the target trajectory, wherein the step of sequentially classifying each of the second points into only one of the second blocks comprises:
classifying the pth second point of each candidate trajectory into the qth second block of each candidate trajectory; and
determining whether a longitude range or a latitude range of the second points in the qth second block is larger than the spatial parameter, or a time range of the second points is larger than the temporal parameter, so as to determine whether to reclassify the pth second point into the (q+1)th second block, wherein p is a positive integer incremented from 1 to a total number of the second points of the candidate trajectory, and q is a positive integer incremented from 1 to a total number of the second blocks of the candidate trajectory.

13. The computing method as claimed in claim 12, wherein the step of determining the sequence of first blocks for the target trajectory according to the first points of the target trajectory comprises:
forming a three-dimensional object in a spatiotemporal coordinate system according to each of the first blocks of the target trajectory, wherein the size of the first blocks was defined by the spatial parameter and the temporal parameter;
taking the kth first point of the target trajectory classified into the jth first block as a spatial reference point, wherein the kth first point is a point first classified into the jth first block, and k is a positive integer between 1 and the total number of the first points of the target trajectory; and
calculating a plurality of ranges of the first points in the jth first block according to the spatial reference point and the first points in the jth first block, wherein the ranges of the first points in the jth first block comprises the longitude range, the latitude range and the time range of the first points in the jth first block, wherein the step of determining the sequence of second blocks for each candidate trajectory according to the second points of each candidate trajectory comprises:
forming a three-dimensional object in a spatiotemporal coordinate system according to each of the second blocks of each candidate trajectory, wherein the size of the second blocks was defined by the spatial parameter and the temporal parameter;
taking the rth second point of each candidate trajectory classified into the qth second block as a spatial reference point, wherein the rth second point is a point first classified into the qth second block, and r is a positive integer between 1 and the total number of the second points of each candidate trajectory; and calculating a plurality of ranges of the second points in the qth second block according to the spatial reference point and the second points in the qth second block, wherein the ranges of the second points in the qth second block comprises the longitude range, the latitude range and the time range of the second points in the qth second block.

14. The computing method as claimed in claim 13, wherein after the step of calculating the ranges of the first points in the jth first block according to the spatial reference point in the jth first block, the computing method further comprises:
determining a direction of the jth first block according to a connection line between the kth first point and the mth first point classified into the jth first block, wherein m is a positive integer between k+1 and the total number of the first points of the target trajectory, wherein after the step of calculating the ranges of the second points in the qth second block according to the spatial reference point in the qth second block, the computing method further comprises:
determining a direction of the qth second block according to a connection line between the rth second point and the sth second point classified into the qth second block, wherein s is a positive integer between r+1 and the total number of the second points of each candidate trajectory.

15. The computing method as claimed in claim 12, wherein the step of determining the sequence of first blocks for the target trajectory according to the first points of the target trajectory comprises:
finding out a maximum time and a minimum time of all the first points in the jth first block to calculate the time range of the first points in the jth first block, wherein the step of determining the sequence of second blocks for each candidate trajectory according to the second points of each candidate trajectory comprises:
finding out a maximum time and a minimum time of all the second points in the qth second block to calculate the time range of the second points in the qth second block.

16. The computing method as claimed in claim 11, wherein the step of selecting the at least one of the second blocks which overlaps with the at least one of the first blocks, and obtaining the second points classified in the selected at least one second blocks comprises:
sequentially comparing a difference between a center of each of the second blocks of the candidate trajectories and a center of each of the first blocks of the target trajectory with a spatial parameter and a temporal parameter; and
sequentially comparing an included angle between a direction of each of the second blocks of the candidate trajectories and a direction of each of the first blocks of the target trajectory with an included angle parameter, so as to determine whether each of the second blocks of the candidate trajectories overlaps with at least one of the first blocks of the target trajectory.

17. The computing method as claimed in claim 16, wherein after determining whether each of the second blocks of the candidate trajectories overlaps with at least one of the first blocks of the target trajectory, the computing method further comprises:
recording the second blocks of the candidate trajectories determined to be overlapped with the at least one first block of the target trajectory in a matrix according to each of the at least one first blocks of the target trajectory; and
screening the at least one of the candidate trajectories according to the matrix.

18. The computing method as claimed in claim 17, wherein the step of screening the at least one of the candidate trajectories according to the matrix comprises:
calculating a total compliance number of the second blocks of the candidate trajectories determined to be overlapped with the at least one first block of the target trajectory and recorded in the matrix; and
screening the at least one of the candidate trajectories according to the total compliance number.

19. The computing method as claimed in claim 11, wherein the step of calculating the ridesharing paths in the target trajectory according to the obtained second points classified in the selected at least one second block comprises:
restoring the second points classified in the selected second blocks which overlaps with at least one of the first blocks; and
calculating the ridesharing paths according to the restored second points.

20. A non-transitory computer-readable recording medium, recording a program, a target trajectory and a plurality of candidate trajectories, and being located to a computing apparatus to execute following steps:
determining a sequence of first blocks for the target trajectory according to a plurality of first points of the target trajectory, and sequentially classifying each of the first points into only one of the first blocks, wherein each first block has a same predetermined size;
determining a sequence of second blocks for each candidate trajectory according to a plurality of second points of each candidate trajectory, and sequentially classifying each of the second points into only one of the second blocks, wherein each second block has the same predetermined size;
selecting at least one of the second blocks which overlaps with at least one of the first blocks, and obtaining the second points classified in the selected at least one second blocks;
calculating ridesharing paths in the target trajectory according to the obtained second points classified in the selected at least one second block; and
displaying the calculated ridesharing paths on a display of the computing apparatus.

* * * * *